United States Patent [19]
Simmons et al.

[11] Patent Number: 5,565,049
[45] Date of Patent: Oct. 15, 1996

[54] METHOD OF MAKING MATS OF CHOPPED FIBROUS MATERIAL

[75] Inventors: F. Arthur Simmons, Atlanta; George M. Elliott, Woodstock; Douglas D. King, Canton, all of Ga.

[73] Assignee: Astechnologies, Inc., Roswell, Ga.

[21] Appl. No.: 456,771

[22] Filed: Jun. 1, 1995

Related U.S. Application Data

[63] Continuation of Ser. No. 95,408, Jul. 23, 1993, abandoned.

[51] Int. Cl.$^6$ .......................... B32B 31/00; B32B 19/02; B32B 17/02

[52] U.S. Cl. .................. 156/62.6; 156/62.2; 156/256; 156/283; 156/289; 156/296; 156/311; 156/320; 156/212; 264/109; 427/195

[58] Field of Search .................. 156/62.2, 62.6, 156/180, 181, 441, 433, 324, 256, 283, 289, 296, 311, 320, 212; 264/109; 427/195

[56] References Cited

U.S. PATENT DOCUMENTS

| | | |
|---|---|---|
| 2,543,101 | 2/1951 | Francis, Jr. . |
| 2,830,648 | 4/1958 | Haddox . |
| 3,002,857 | 10/1961 | Stalego . |
| 3,244,580 | 4/1966 | Stalego . |
| 3,669,638 | 6/1972 | Wong et al. . |
| 3,684,467 | 8/1972 | Smucker . |
| 3,684,645 | 8/1972 | Temple et al. . |
| 3,819,441 | 6/1974 | Fargo et al. . |
| 3,865,661 | 2/1975 | Hata et al. . |
| 4,258,098 | 3/1981 | Bondoc et al. . |
| 4,289,664 | 9/1981 | Gomez et al. . |
| 4,596,737 | 6/1986 | Werbowy et al. . |
| 4,620,860 | 11/1986 | Werbowy . |
| 5,024,890 | 6/1991 | Pollet et al. . |
| 5,051,122 | 9/1991 | Reese et al. . |
| 5,108,798 | 4/1992 | Guerro et al. . |
| 5,147,653 | 9/1992 | Nelson . |
| 5,472,541 | 12/1995 | Simmons et al. .......... 427/195 X |

*Primary Examiner*—Jeff H. Aftergut
*Attorney, Agent, or Firm*—Barnes, Kisselle, Raisch, Choate, Whittemore & Hulbert, P.C.

[57] ABSTRACT

The subject matter of this invention relates to a method of making glass fiber mat reinforcement material with a thermoplastic adhesive powder. Fiberglass strands are chopped and randomly air dropped onto a Teflon® coated conveyor belt to form a loose mat. A water mist is then applied to the loose mat and transport belt, before a powdered adhesive is dispensed. Heat is applied to plasticize the adhesive and finally the adhesive is solidified by cooling. The adhesive will then release from the transport belt and is adhered to the material forming the fiberglass reinforcement mat.

7 Claims, 3 Drawing Sheets

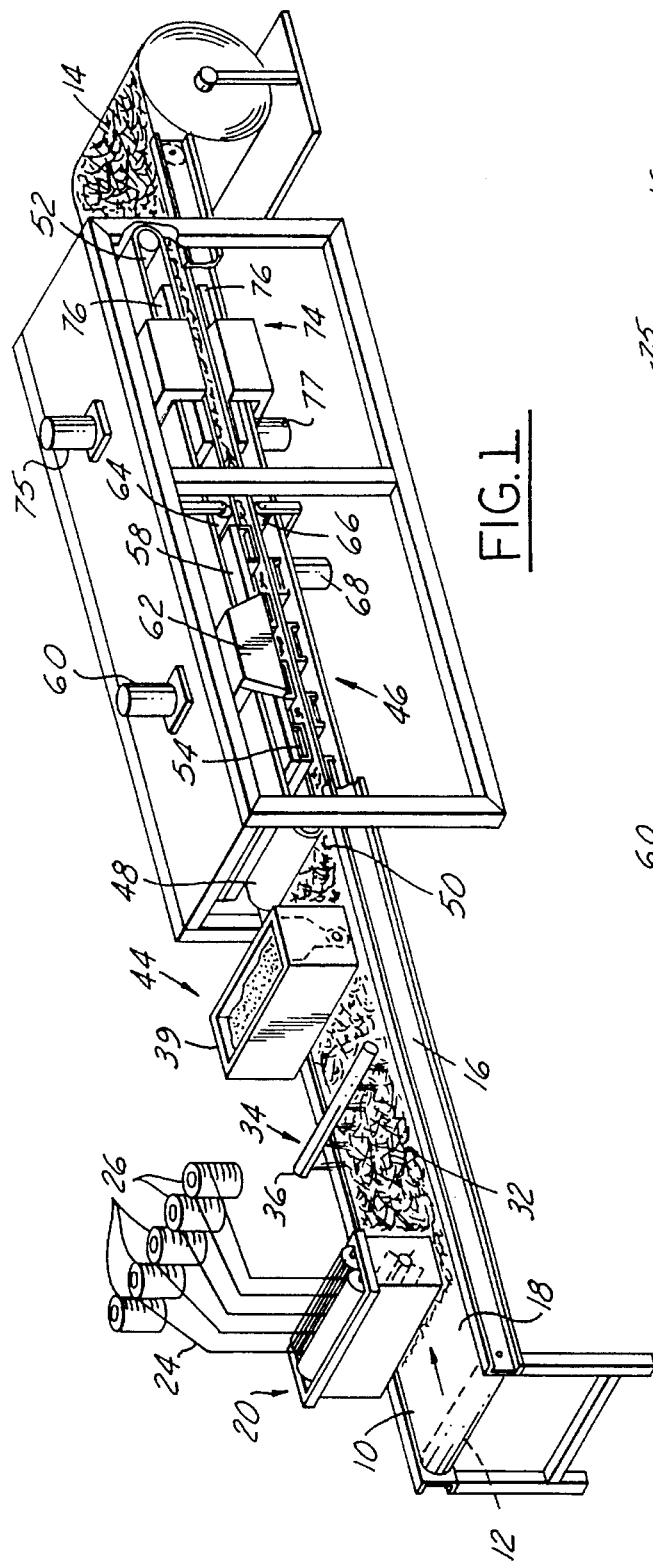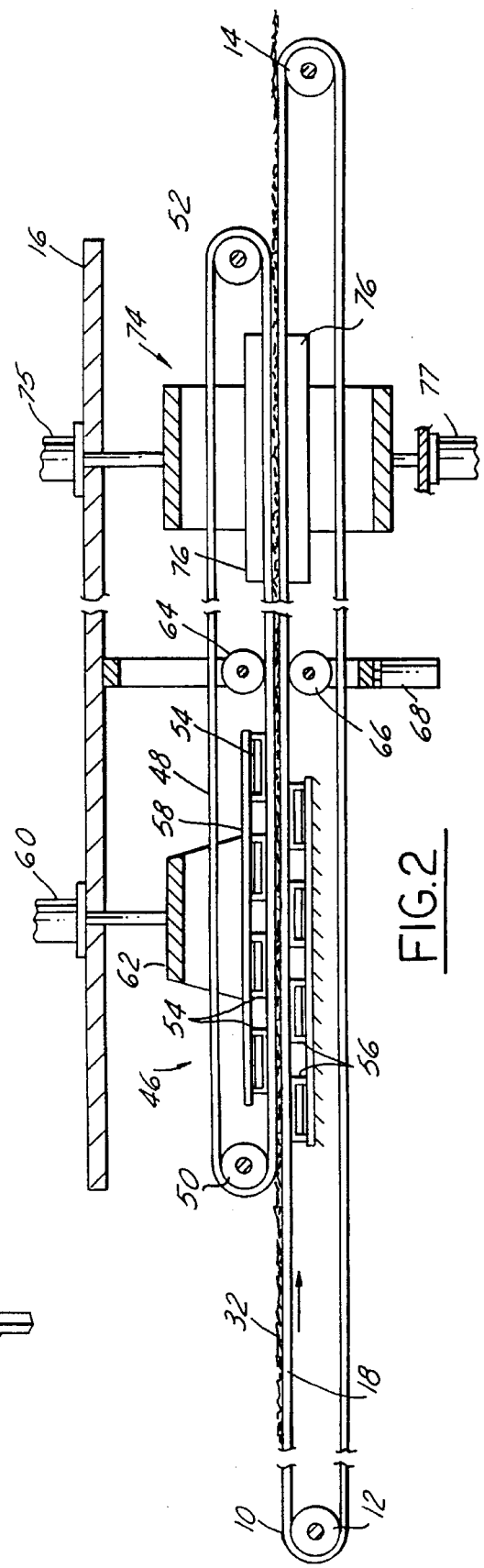

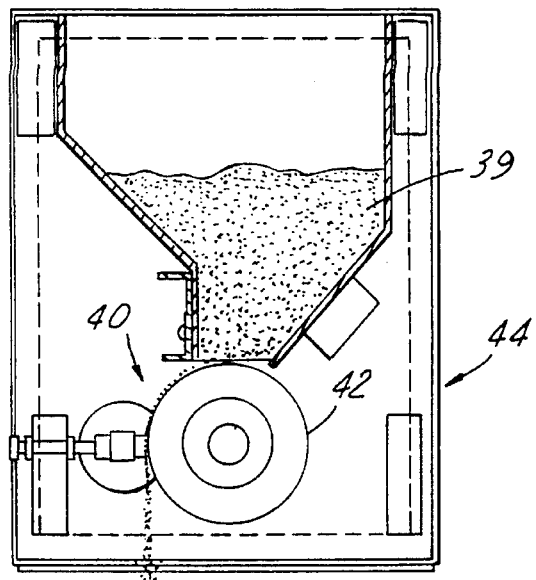
FIG.5
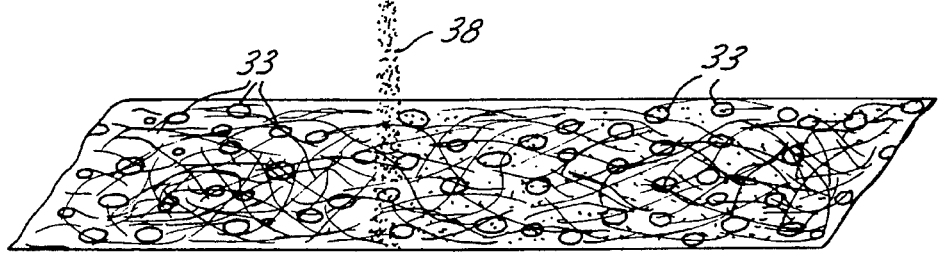
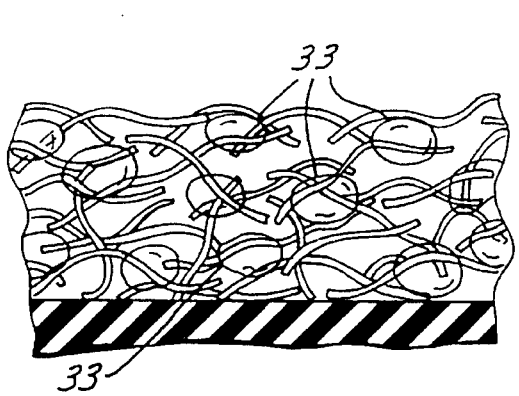
FIG.6
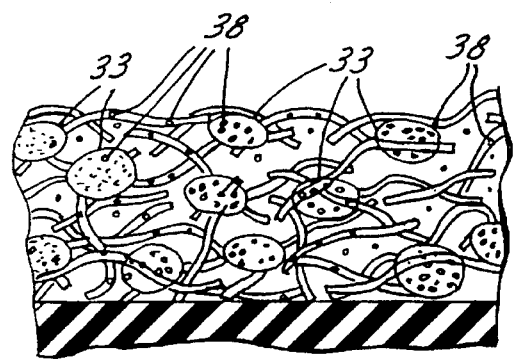
FIG.7
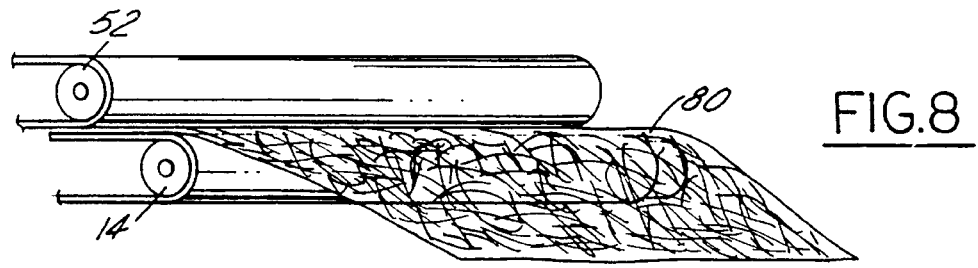
FIG.8

METHOD OF MAKING MATS OF CHOPPED FIBROUS MATERIAL

REFERENCE TO RELATED APPLICATION

This application is a continuation of application Ser. No. 08/095,408, filed Jul. 23, 1993, now abandoned.

FIELD OF USE

The present invention relates to a process for making mats of chopped fibers. More particularly, the invention relates to making reinforcement mats of chopped glass fiber strand material adapted to be subsequently laminated to another material or substrate for the purpose of reinforcing and rigidizing that substrate.

DESCRIPTION OF RELATED ART

In order to provide background information so the invention may be completely understood and appreciated in its proper context, reference may be made to a number of prior art patents as follows:

The Reese, et al, U.S. Pat. No. 5,051,122 discloses a method and apparatus for making mats of continuous glass fiber strands in which a heated calendering roll and continuous belt are used to compact the mat. A plurality of strand feeders are traversed across the surface of a moving perforated conveyor with each feeder drawing at least one continuous strand from a supply source and projecting it onto the surface of the conveyor belt to form a loose fibrous mat structure. A thermosetting resinous material is distributed throughout this loose mat which is then passed between a second moving conveyor or belt and at least one heated calendering roller. The invention speaks of an embodiment that uses water to wet the mat for easier distribution of the resinous material or another embodiment using one continuous thread of resinous material spooled out simultaneously with the glass strands. As the mat passes to a second conveyor belt it is pinched between the surfaces of the conveyor and a separately driven, rotating, heated calender roll. As the mat passes around the circumference of the roll it is compacted against it by the tension of the belt. As the belt turns, it separates the compacted mat from the calender roll and continues its path. Steam from the heating of the mat by the calender roll is vented away by means of a hood. The present invention is distinguishable from the Reese, et al, U.S. Pat. No. 5,051,122 at least in part because chopped strands of fibrous material and a thermoplastic adhesive are used to provide a layered matting and the mat travels on one continuous belt through a heating station (not calender roller) where plasticization occurs and then a cooling station that allows the matting to solidify and release from the transport belt.

The method disclosed in Bondoc, et al, U.S. Pat. No. 4,258,098 relates glass fiber mats which include an improved binder, particularly for application in roofing and flooring products. Bundles of chopped glass fibers are added to a dispersant medium to form an aqueous slurry that is soaked in an excess of binder solution and dewatered under vacuum to remove excess binder solution. The present invention is more efficient due to the use of the fine vapor mist, in that there is no aqueous slurry and therefore no waste or excess of a binder solution and no need for dewatering under vacuum.

There are two (2) Werbowy, et al, patents, U.S. Pat. Nos. 4,620,860 and 4,596,737 that disclose a method of manufacturing glass products and treating glass fiber mats used for exterior insulating. In the manufacture, glass fibers are combined with a heat curable binder and then consolidated onto a conveyor. The process for treating the glass fiber mats comprises the steps of combining and consolidating the glass fibers with a heat curable binder composition to form a loosely packed mass, then curing the fibers, before coating said cured fibers with an elastomeric latex polymer. The present invention teaches of the use of a thermoplastic adhesive to form a reinforcement mat instead of insulation material. The use of the thermoplastic adhesive in this invention allows the mat in a subsequent application to replasticize to laminate the mat to whatever substrate the reinforcement material is applied. This replasticization is foreclosed by the use of a heat curable binder as used in the Werbowy, et al, patents.

The Haddox U.S. Pat. No. 2,830,648 relates to a process for the production of fibrous insulation materials in mat form that utilizes melted molten glass marbles that are exuded through small holes in the form of primary filaments which receive a gaseous blast of intense heat that melts the downwardly moving ends of the filaments to attenuate the filaments into very fine fibers. Following the spray of a thermosetting synthetic resin onto the fibers, the process employs a vacuum pump that attracts the fibers to the surface of the belt and a pressure chamber to compress the mat before moving to an oven. The use of a gaseous blast of intense heat to attenuate the fibers is foreclosed by the use of preformed strands of bundled fiber. The use of a thermoplastic adhesive in the present invention will allow the mat to replasticize to a substrate during a subsequent application unlike the use of a thermosetting synthetic resin which will not replasticize upon reheating. The present invention employs dual transfer belts to compact the glass fiber material to its desired thickness without the use of either a vacuum pump or pressure chamber.

Stalego U.S. Pat. No. 3,244,580 discloses the projection of fibers and a phenolic binder composition coupled with a tall oil-pinewood pitch onto a foraminous conveyor, and advancing the collected fibers through a suitable curing oven to cause hardening of the binder composition. Again, the use of a thermoplastic adhesive in the present invention will plasticize unlike the phenolic binder composition which will not replasticize upon reheating and therefore requires another procedure for subsequent laminating. The absence of a cooling stage in this and many of the other cited patents will cause the plasticized fibrous mats to stick to the conveyors (where used) and thereby cause more waste than the present invention.

The Guerro, et al, U.S. Pat. No. 5,108,798 discloses a method of making fiberglass insulation by reference to an aqueous binder solution being sprayed from a nozzle onto the fibers which fall onto a conveyor belt and are continuously removed as a fiberglass mat and subsequently cured by passing through an oven. The binder composition comprises a beta-hydroxy urethane functional material and a polycarboxylic acid. The present invention dispenses resin from a resin containing hopper as opposed to the use of an aqueous binder solution being sprayed from nozzles, thereby producing a fiberglass reinforcement mat instead of fiberglass insulation.

The Gomez, et al, U.S. Pat. No. 4,289,664 relates to the manufacture of phenol/formaldehyde resins and specifically to certain novolac resins as binders for glass fiber insulation materials. Again, the use of a thermoplastic adhesive in the present invention will replasticize unlike the novolac resins which will not replasticize upon reheating. This patent does not describe a process for making a fibrous mat, instead only the manufacture of the resin itself.

The Wong, et al, U.S. Pat. No. 3,669,638 teaches producing bonded randomly oriented glass fiber mats and batts wherein molten streams of glass are attenuated by a stream of hot gases from which the fibers are collected in the form of a mat. The binder is applied to the glass fibers of the mats or batts in an aqueous gel thickened state, whereas the present invention applies the binder in a powdered form to vapor misted attenuated fibers.

The Smucker, et al U.S. Pat. No. 3,684,467 discloses a method of making a bonded glass fiber product comprising forming glass fibers with a heat curable binder composition. The combination of glass fibers and the heat curable binder is consolidated into a loosely packed mass on a conveyor. The mass is optionally compressed to increase the density thereof and subsequently the heat curable binder is cured in situ on the glass fibers to form the desired product. The use of the heat curable aqueous binder composition forecloses any subsequent lamination without adding any additional composition, whereas the present invention will replasticize upon reheating because of the use of a thermoplastic adhesive instead of a heat curable binder.

Stalego, U.S. Pat. No. 3,002,857, discloses a process that forms a mat of glass fibers to bond with a phenol formaldehyde resin and then coated with an inorganic binder composition consisting essentially of sodium silicate and a boron containing compound. The use of the phenol formaldehyde resin forecloses any subsequent lamination because upon reheating unlike the present invention the phenol formaldehyde produced mat will not replasticize.

Phenol-formaldehyde resin binders are routinely used in the prior art. These resins are typically used in connection with an aqueous solution, containing free formaldehyde. A shortcoming of the prior art binder resins is that they tend to emit formaldehyde during the manufacture of fiberglass products. Additionally these phenolic resins are incapable of replasticizing during reheating or subsequent lamination, and therefore unlike the present invention these manufactured fiberglass products would require the application of additional materials to laminate them to substrates.

Whatever the precise merits, features and advantages of the above cited patents, none of them achieves or fulfills the purposes of the present invention. A novel process is disclosed herein for the production of mats of chopped fibrous material which advantageously overcomes their difficulties and problems associated with conventional prior art processes. A mat produced by the process of this invention is not designed for use on its own or by itself, but rather to be combined with another material or substrate for the purpose of rigidizing that substrate.

One object of this invention is to provide a method of making fiber reinforcement sheet material which is an improvement on prior art methods.

Another object is to provide a method which is relatively simple to carry out and is fast and efficient in operation.

Other objects, features and advantages will become apparent as the following description proceeds, especially when considered with the accompanying drawings.

BRIEF DESCRIPTION OF THE DRAWINGS

FIG. 1 is a semi-diagrammatic perspective view of apparatus suitable for practicing the method of this invention.

FIG. 2 is a side elevational view, with parts broken away and in section, of the apparatus of FIG. 1.

FIG. 5 is a view of the station where adhesive is applied.

FIGS. 6 and 7 are enlarged fragmentary views of different portions of FIG. 5.

FIG. 8 is a fragmentary perspective view of the fiber reinforcement sheet material made by the practice of this invention.

DETAILED DESCRIPTION

Referring now more particularly to the drawings, and especially to FIGS. 1 and 2, an elongated endless transport belt 10 extends over a pair of parallel, horizontal rollers 12 and 14 mounted in longitudinally spaced apart relation on a frame 16. One of the rollers is power driven to cause the belt to orbit, preferably continuously, with its horizontal top run 18 moving in the direction of the arrow.

The transport belt is made of any suitable flexible material. The belt may, for example, be made of a woven, high temperature resistant material such as Kevlar® or a glass fiber-reinforced resinous plastic material and is coated on its outer surface with a suitable release material, preferably polytetrafluorethylene (TFE) or fluorinated ethylenepropylene (FEP) marketed under the trademark Teflon®. This release coating provides the belt with a nonporous surface capable of releasing adhesive which may become adhered thereto in the practice of this invention, as will become more apparent from the following description.

Figure 3:
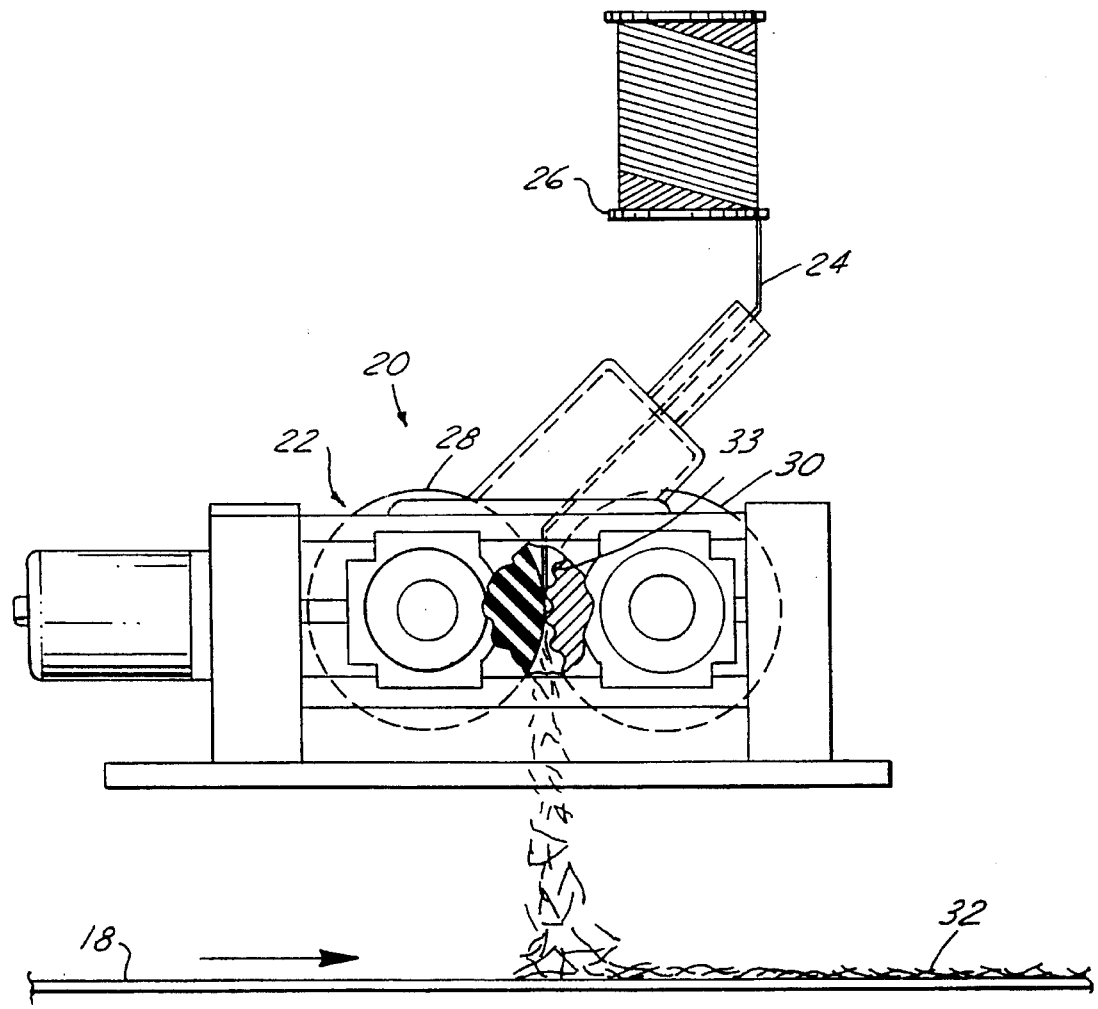
FIG. 3 is a view of the strand cutting station.

A strand cutting station 20 (FIG. 3) is located above the top run 18 of the belt near the left end thereof as viewed in FIG. 1. At station 20, a chopper assembly 22 receives and draws bundled continuous fiber strands 24 from spools 26 positioned above the chopper assembly. The continuous fiber strands 24 are preferably made of glass, but could be made of other materials such as polypropylene, nylon, rayon or polyester. The chopper assembly consists essentially of two rolls 28 and 30 on parallel axes which peripherally engage and are counter-rotated by power means (not shown) to chop the individual strands into strand elements or fibers which are preferably 1 to 2 inches in length. The fibers may, of course, be longer or shorter as desired. The chopped strands or fibers are then air dropped randomly onto the top run of the transport belt forming a loose fibrous mat structure 32. The rolls of the chopper assembly may be of any suitable construction and in this instance one has axially extending, circumferentially spaced ribs 33 which engage the resilient rubber-like face of the other to perform the chopping operation.

Figure 4:
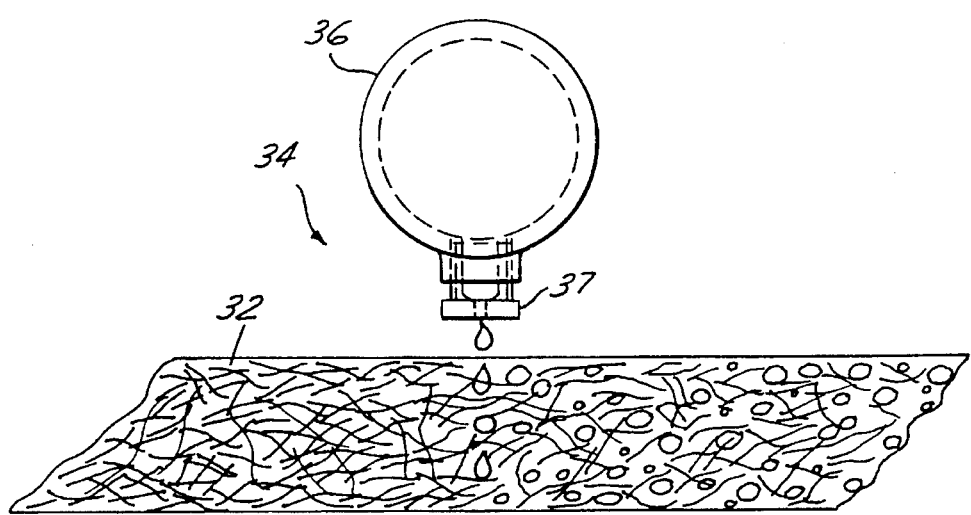
FIG. 4 is a view of the misting station.

Beyond the strand cutting station 20 is a misting station 34 (FIG. 4) likewise positioned above the top run 18 of the belt. At the misting station, a water pipe 36 above the top run 18 extends across the full width of the belt and has spaced spray nozzles 37 on the under side which spray a fine mist of water onto the loose fibrous mat structure 32 on the top surface of the belt. The mist may be applied to the belt in varying amounts, for example, 1 to 8 grams per square foot. The water may be taken from a standard municipal water supply line. Condensed steam or vapor may also be used. The temperature of the water and of the transport belt at this point will be maintained substantially below 212° F. to prevent vaporization and loss of water to the atmosphere. The moisture from the nozzles prevents much if not most of the powdered adhesive granules (to be described later) from migrating through the loose fibrous mat structure 32 in order to maintain as much of the adhesive as possible on the surface of the mat fibers during movement on the transport belt. The moisture further reduces static electricity and provides a substantial benefit in the subsequent plasticizing of the adhesive as more fully described hereinafter.

The top run 18 of the transport belt moves from the misting station 34 to the next station (FIG. 5) where adhesive powder is applied uniformly over the top surface of the mat structure 32. Powdered adhesive granules 38 contained in the hopper 39 are metered out of the adhesive applicator 40 onto a grooved or wire covered roll 42 and fall by gravity in and onto the fibers of the loose fibrous mat structure 32. As stated above some of the adhesive granules penetrate the mat structure and come to rest on the Telfon® covered transport belt. As shown, the hopper 39 and roll 42 are parts of a dispensing unit 44 mounted in spaced relation above the transport belt. Other methods of dispensing the adhesive powder can be employed. The adhesive is preferably dispensed in a uniform pattern over the surface of the mat 32 in a width as required depending on the width of the mat and preferably in a range of 0.5 to 60 grams per square meter, as desired.

The adhesive employed in this process is thermoplastic and is preferably, but not necessarily, a polyamide adhesive which has a particle size of about 100–500 microns and will activate at about 212° F. or above. Polyesters, EVA and other thermoplastic adhesives in powder form may also be used. Excellent results may be achieved with a thermoplastic polyamide adhesive No. H005 in powder form produced by Elf-Atochem Co. which has a particle size of about 200–500 microns. This adhesive plasticizes at about 240° F. to 260° F. with dry heat and about 212° F. to 215° F. with vapor, that is, it becomes sufficiently tacky at those temperatures to adhere to the water-treated surface of the glass fibers Of the mat. Higher temperatures may be used, if desired.

In FIGS. 5–7, the water droplets 33 from the misting station are shown greatly enlarged in order to depict the manner in which these droplets support the adhesive powder and keep the adhesive powder, or a large portion thereof, within the body of the mat rather than allowing it to drop through the loose mat structure onto the belt. Inevitably, some of the powder will pass through the mat and onto the belt, but the water droplets stop a large percentage of the adhesive granules from passing through to keep them more or less within the body of the mat structure and on the surface of the mat fibers. FIG. 7 shows some of the powder granules 38 entrapped by the water droplets, some on the fibers and some having passed through the mat onto the belt.

The mat structure with applied adhesive and moisture advances to a heating station 46. At the heating station a second transport belt 48 is provided to assist in advancing the mat structure and compressing it. This second transport belt is positioned above the first transport belt and extends over a pair of parallel horizontal rollers 50 and 52 mounted in longitudinally spaced apart relation on the frame. The rollers 50 and 52 are parallel to the rollers 12 and 14 which support the first belt 10 and are positioned above the first belt so that the bottom run of the second belt 48 is disposed slightly above and parallel to the top run 18 of the belt 10 and contacts the mat structure as it passes therebetween. The mat structure is thus sandwiched between the belts under a certain amount of pressure which compacts the mat structure into a thin sheet. The roller 52 is power driven causing the second belt 48 to orbit at the same speed as the first belt 10 so that the two belts together advance the mat structure through and beyond the heating station. The belt 48 may be of the same construction as belt 10, with a similar coating of a suitable release material on its outer surface.

At the heating station 46 there are heating elements 54 above the lower run of the top belt 48 and heating segments 56 beneath the upper run of the bottom belt 10 to apply heat to the belts, and to the adhesive coated fibrous mat structure between the belts.

The lower heating segments 56 are normally fixed and the upper heating segments 54 are mounted on a platen 58 and are adjustable vertically by any suitable means such as the hydraulic or air cylinder 60 to provide a preset space between the upper and lower heating elements and a predetermined amount of pressure on the transport belts and on the mat structure. The platen 58 is connected to the cylinder 60 by a frame 62 which clears the upper run of the top belt. Separate cylinders may be provided for the individual upper heating elements, if desired.

A sufficient and predetermined amount of pressure on the transport belts 10 and 48 by the heating elements causes the mat structure to flatten out and the adhesive to become plasticized. The temperature of the heating segments is adjustable to provide the correct temperature and viscosity of the adhesive on the fiber strands. By controlling the amount of moisture and temperature of the adhesive on the loose fibers of the mat structure, the amount of adhesive allowed to permeate through to the surface of the mat can be controlled as desired.

Pressure nip rollers 64 and 66 may be provided to apply additional pressure as required or desired to produce a more dense or thinner sheet of fiber-reinforcement material. The upper nip roller in this instance is shown as turning on a fixed axis and the lower nip roller is movable up and down by a hydraulic or air cylinder 68.

At the heating station, the adhesive in the mat structure is heated to an activating or plasticizing temperature in order to cause the adhesive to soften sufficiently and become viscous enough to thoroughly coat the surfaces of the fibers. Using the H005 adhesive and water misting referred to above, the temperature of the adhesive in the heating station may be raised to a temperature on the order of about 212° F. to 350° F. and preferably 240° F. to 260° F. Obviously this temperature will vary depending upon the materials and adhesives used, the amount of water, and amount of adhesive penetration desired, as well as the speed of the transport belt.

The pressure of the belts on the adhesive coated fiber mat structure at the heating station presses the mat structure into a very thin sheet with the fibers bonded together at points of crossing by the adhesive.

The compressed fibers and adhesive binder, now in sheet form, progresses beyond the heating station 46 to a cooling station 74 where the pressure on the adhesive coated and compressed fiber mat structure is maintained. The cooling segments 76 at the cooling station are above and below the two conveyor runs between which the mat structure is compressed and are vertically adjustable to provide a predetermined amount of compression during the time that the temperature of the transport belts and the adhesive covered fibrous mat structure is lowered below the plasticizing temperature of the adhesive, allowing the adhesive to resolidify. Air or hydraulic cylinders 75 and 77 connected to the cooling segments by frames 79 adjust the cooling segments vertically as desired to exert the desired amount of compression on the mat. The compressed, adhesive covered fibrous mat structure is brought down to a temperature below the initial plasticizing temperature of the adhesive, in this instance substantially below 212° F., causing the adhesive to resolidify and bond the fibers together, and any adhesive that is adhered to the belt or belts to release therefrom. The belt 10 advances the resulting fiber reinforcement sheet material 80 (FIG. 8) beyond the cooling station where it may be either rolled up or cut to length as desired.

The mat is compressed by the method of this invention to a thickness not exceeding 3.5 millimeters, and preferably to a thickness of 1.5 to 2.0 millimeters. The mat made by the method of this invention contains 300 or less grams of fibers per square meter and preferably 80 to 150 grams of fibers per square meter.

The fibers of the sheet of reinforcement material are bonded together by a thermoplastic adhesive binder at points of crossing but with open spaces between the fibers. The thermoplastic adhesive binder when re-heated will re-plasticize and allow the fibers to move as required during a subsequent forming process as when laminating the reinforcement sheet to a suitable substrate. The mat is not designed for use by itself but rather to be combined with a substrate for the purpose of rigidifying the substrate. This is very useful for deep draw areas or three dimensional shapes and also will provide the adhesive necessary when laminating to substrate materials.

What is claimed is:

1. A method of making thermoformable fiber reinforcement sheet material adapted to be laminated to a substrate for the purpose of rigidifying the substrate comprising the steps of:
    (a) providing a single elongated support belt having a support surface coated with a release agent which seals the support surface and renders it substantially nonporous,
    (b) advancing said support belt lengthwise along a predetermined path past a heating station and a cooling station in sequence,
    (c) in advance of said heating station
        (1) distributing a multiplicity of relatively short fibers on said release agent coated surface of the advancing support belt at a fiber distribution station to form a loose mat of fibers,
        (2) then at a misting station downstream from said fiber distribution station spraying moisture downward on said loose mat of fibers to form droplets of moisture thereon, and
        (3) then at an adhesive powder station downstream from said misting station sprinkling a coating of a thermoplastic resinous adhesive powder downward on said loose mat of fibers to cause the powder to cling to the fibers and to the droplets on the fibers and to substantially reduce migration of the powder through the loose mat of fibers,
    (d) providing a single elongated compression belt having a compression surface coated with a release agent,
    (e) positioning said compression belt in closely spaced relation above said support belt with said compression surface facing said support surface,
    (f) advancing said compression belt along said predetermined path in unison with said support belt so that said compression belt cooperates with said support belt in advancing said mat through said heating station, from the heating station to the cooling station, and through the cooling station,
    (g) heating said mat at said heating station to plasticize and soften the adhesive sufficiently to thoroughly coat the surfaces of the fibers,
    (h) compressing said mat between said belts under adjustable predetermined pressure as said mat advances through said heating station, from said heating station to said cooling station, and through said cooling station to press the mat into sheet form having a thickness not exceeding about 3.5 millimeters and containing not more than about 300 grams per square meter of fibers,
    (i) cooling said mat at said cooling station to
        (i) solidify said adhesive,
        (ii) adhere said fibers together thus forming said fiber reinforcement sheet material, and
        (iii) release any adhesive adhering to said compression and support surfaces of said belts, and
    (j) removing said fiber reinforcement sheet material.

2. A method as in claim 1, wherein the mat is compressed to a thickness of 1.5 to 2.0 millimeters and contains 80 to 150 grams per square meter of fibers.

3. A method as in claim 2, wherein said fibers are made of glass.

4. A method as in claim 2, wherein said fibers are made of rayon.

5. A method as in claim 2, wherein said fibers are made of polyester.

6. A method as in claim 2, wherein said fibers are made of polypropylene.

7. A method as in claim 2, wherein said fibers are made of nylon.

\* \* \* \* \*